July 5, 1938.  A. D. KEENE  2,122,650
ELECTRIC HEATING PAD
Filed Oct. 15, 1937  2 Sheets-Sheet 1

INVENTOR
ALVIN D. KEENE
BY
ATTORNEY

Patented July 5, 1938

2,122,650

UNITED STATES PATENT OFFICE 2,122,650

ELECTRIC HEATING PAD

Alvin D. Keene, Rochester, N. Y., assignor to Samson-United Corporation, Rochester, N. Y.

Application October 15, 1937, Serial No. 169,312

7 Claims. (Cl. 219—46)

This invention relates to electric heating pads and the like and has for one of its objects to provide a pad with which it is possible to obtain different degrees of heat by means of a simplified thermostatically controlled electric circuit.

Another object of this invention is to provide a heating pad which may be automatically controlled for operation at three different degrees of heat with but a single thermostat.

A further object of this invention is to provide a heating pad with positive regulation for the different heats to be given off thereby.

All these and other objects and attendant advantages will become more readily apparent from the detailed description thereof which follows, reference being had to the accompanying drawings in which Figure 1 shows a schematic diagram of the heating pad embodying my invention.

Heretofore heating pads have been provided with a plurality of thermostats which were set to operate at different temperatures for the control of one or more electric circuits for the purpose of producing various temperatures in the pad. In my present invention the control for the various temperatures of the pad is accomplished with but one thermostat.

Figures 1, 2:
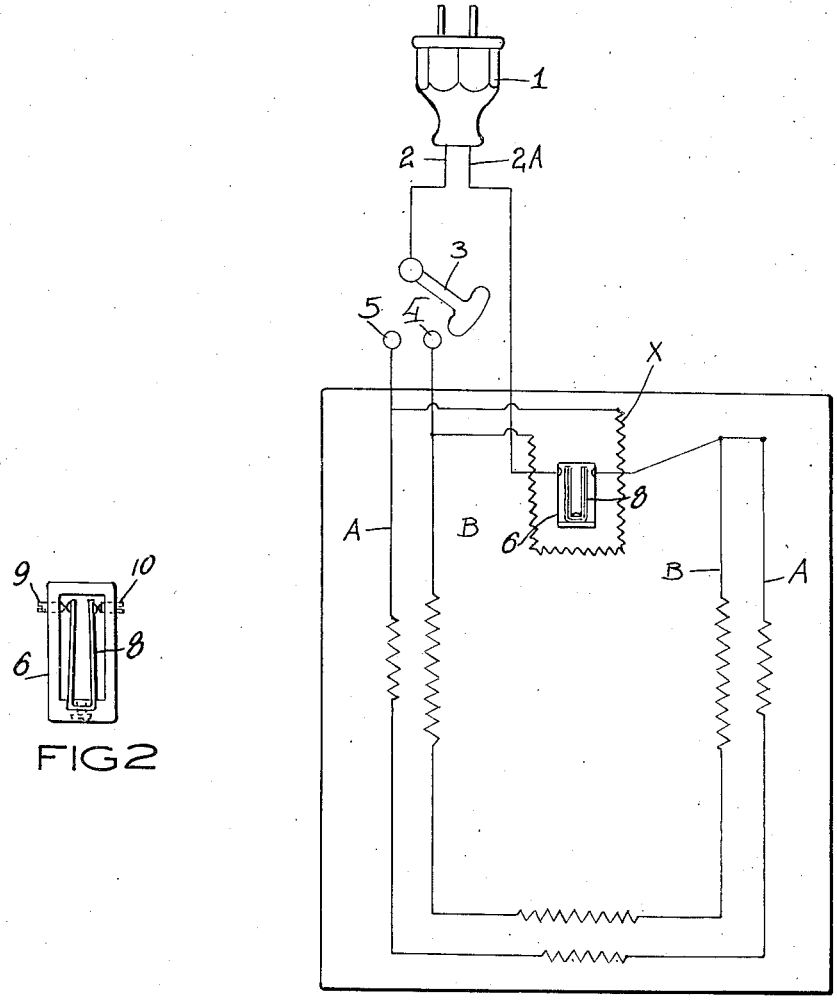
Figure 2 is a detail top plan view of the thermostat used in connection with my invention.

As illustrated in Figure 1, the pad is provided with a suitable plug 1 with which it is connected to the line circuit. A manually operated switch is connected into the conductor 2 of the electric cord leading from the plug 1 and includes a movable contact member 3 and two stationary contact members 4 and 5. The movable contact member is constructed and operated to make contact with either one or the other or both of the stationary contact members for the regulation of various temperatures of the heating pad. The conductor 2A of the electric cord leading from the plug 1 is directly connected to the thermostat 6 in the heating pad to have it automatically open and close all of the electric circuits thru the heating units of the heating pad.

The pad 7 proper may be of any construction except for the arrangement of the electric heating units and their single thermostatic control provided by the thermostat 6. In the form shown in Figure 1, three heating units are used. Heating unit X, as an auxiliary heater, is located in a close heat exchange position with the thermostat 6 for the sole purpose of operating the thermostat and master heating units "A" and "B" for producing the "medium" and "low" temperatures in the heating pad.

The stationary contact 4 of the manually operated switch is connected with one terminal end of the electric heating unit B and the stationary contact 5 of the switch is connected with the corresponding terminal end of the electric heating unit A. The other terminal ends of both heating units are connected in common to one terminal of the thermostat switch 6. In this way current from the line circuit is controlled by the thermostatic switch in passing thru both of the master heating units A and B.

The auxiliary heating unit X is shunted across the terminal ends of the heating units A and B to provide for the operation of these master heating units thru either contact 4 or contact 5 and have the auxiliary heating unit operate only in conjunction with either the one or the other of these master heating units for the operation of the thermostat. The resistance of the heating unit X is comparatively small to that of either of the heating units A and B and its operation with either of these heating units will therefore not materially affect their respective individual or combined heating function.

To bring about a control in the heating pad temperature by means of the auxiliary heating unit the wattage and resistance of the two master heating units A and B differ from each other. For example, heating unit A may have an amperage of 0.3 ampere and heating unit B an amperage of 0.2 ampere when connected across the line. The auxiliary heating unit with its comparatively small electric resistance will thus operate in series with either the one or the other master heating unit and produce a heated area around the thermostat for the operation thereof whether the master heating units are connected thru contact 4 or contact 5 of the switch.

The thermostatic switch 6 is set to operate at one predetermined temperature to be produced by the auxiliary heating unit with or without the assistance of the heat generated by the master heating units. With the auxiliary heating unit operating in series with the master heating unit having the greater wattage the auxiliary heating unit reaches the temperature for the operation of the thermostat quicker than it will in series with the master heating unit having the smaller wattage. As the result of this the thermostat cuts off the current for both master heating units earlier and thus provides the "low" heat in the heating pad when the auxiliary heating unit operates in conjunction with the master heating unit having the greater wattage. The auxiliary heating unit heats up correspondingly slower when in series with the master heating unit having the smaller wattage or higher resistance, in which case both master heating units are connected a longer period before the current is cut off by the thermostat on its operation by the auxiliary heating unit and thus produces the "medium" heat for the heating pad.

For the "high" heat the heating units A and B are simultaneously connected thru the two stationary contacts 4 and 5 of the switch. The auxiliary heating unit X is thus short circuited so that it will not function to operate the thermostat. In this case only heat generated by the two heating units A and B will operate the thermostat whenever the pad has reached the "high" temperature and its transmission to the thermostat effects a movement of the thermostatic member.

Figure 3:
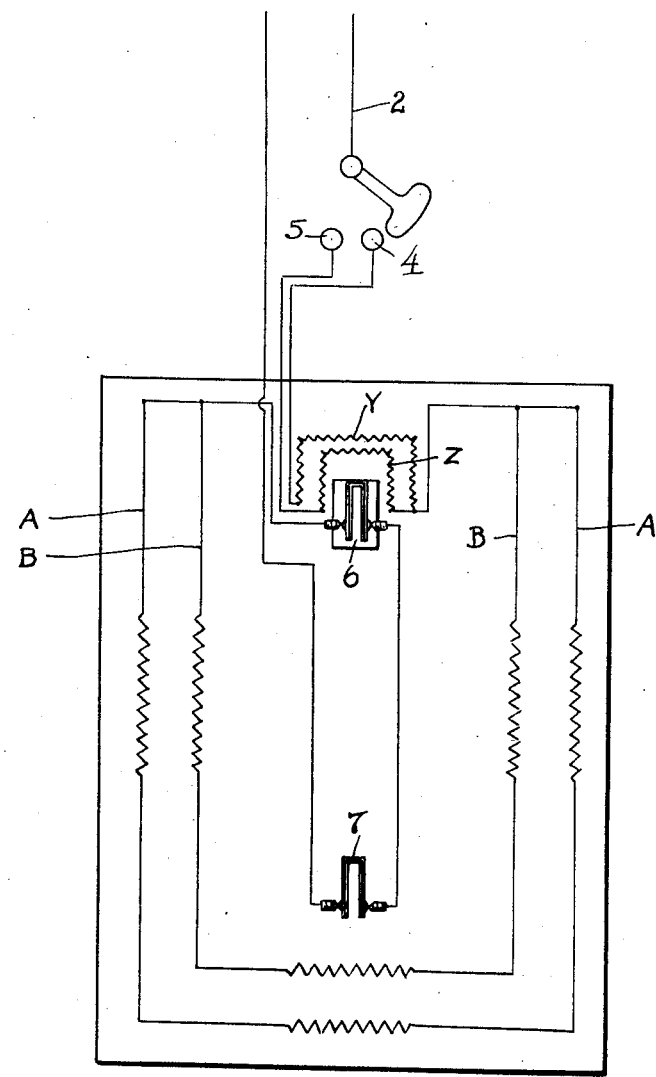
Figure 3 shows a schematic diagram of a modified form of my invention.

In Figure 3 I have illustrated a modified form of electric circuits for the heating pad. In this construction two auxiliary heating units, indicated Y and Z, are used for the operation of the thermostat 6. Contact 4 of the switch is connected with heating unit Y and contact 5 is connected with heating unit Z and both auxiliary heating units are jointly connected to the heating units A and B. In this way electric current from the conductor 2 may pass thru either the contact 4 and the auxiliary heating unit Y to the heating units A and B, or thru the contact 5 and the auxiliary heating unit Z to the heating units A and B. Heating unit Y has a higher resistance than heating unit Z or is placed to have a greater effect on the thermostat so that it more quickly operates the thermostat than heating unit Z. In cutting in the master heating units A and B thru the heating unit Y, the thermostat will thus operate to open the electric circuit quicker in order to provide but a "low" heat in the heating pad. On the other hand, in connecting the heating units A and B thru the auxiliary heating unit Z the operation of the thermostat is delayed so as to provide for a longer generation of heat by the heating units A and B to provide the "medium" heat before the electric circuit is opened by the thermostat. Simultaneously connecting the contacts 4 and 5 with the conductor 2 causes both auxiliary heating units Y and Z to be simultaneously connected, which retards their heating up and further delays the operation of the thermostat so that the heating units A and B are cut in for a still longer period for the generation of the "high" heat in the pad before the electric circuit is opened by the thermostat 6.

An auxiliary thermostat 7 is shown connected in series with the thermostat 6 in Figure 3 to act as a safety cut-out should the pad for some reason get too hot, and a similar thermostat or thermostats may be used in the construction illustrated in Figure 1.

As illustrated in Figure 2, the thermostatic switch 6 comprises a substantially U shaped bimetallic member 8 which is suitably anchored in the middle to cause its free ends to normally make contact with the adjustable terminals 9 and 10 and move out of contact with these terminals when operated by the heat generated by the auxiliary heating unit or units.

I claim:

1. In a heating pad the combination of two electric master heating units, a single thermostat for the control of said master heating units jointly connected in series therewith, an auxiliary heating unit positioned for control of the operation of said thermostat and connected between one terminal of one of said master heating units and one terminal of the other of said master heating units, one of said master heating units having a higher wattage than the other of said master heating units, and said auxiliary heating unit having a relatively small wattage.

2. In a heating pad the combination as set forth in claim 1 including means for connecting said master heating units with said thermostat into an electric supply circuit with the auxiliary heating unit in series with one or the other of said master heating units.

3. In a heating pad the combination as set forth in claim 1 including means for connecting said master heating units with said thermostat into an electric supply circuit with the auxiliary heating unit in series with one of said heating units or short circuited between said master heating unit.

4. In a heating pad the combination with two line circuit terminals, two electric heating units provided in the pad, each having two terminal ends and each having different high wattages, a single thermostat jointly connected in series with one of the terminal ends of both of said heating units and with one of said line circuit terminals, an auxiliary electric heating unit of relatively low wattage connected across the other terminal ends of said heating units and arranged relative to said thermostat for heat exchange between them, and means for connecting said heating units to the second of said line circuit terminals.

5. In a heating pad the combination as set forth in claim 4 including means for connecting said auxiliary heating unit in series with either one or the other of said heating units.

6. In a heating pad, a pair of master electric heating elements each having one end connected to a common terminal, a thermostatic switch having one of its controlled circuit terminals connected to said common terminal, selective switch means for connecting at a given time the free other terminal of either one or both of said master heating elements to one side of a source of supply, the other controlled circuit terminal of said thermostatic switch being connected to the other side of said source of supply, and an auxiliary electric heating element in close heat exchange relation with said thermostatic switch and being connected across the two free terminals of said master heating elements.

7. In a heating pad, a pair of master electric heating elements each having one end connected to a common terminal, a thermostatic switch having one of its controlled circuit terminals connected to said common terminal, selective switch means for connecting at a given time the free other terminal of either one or both of said master heating elements to one side of a source of supply, the other controlled circuit terminal of said thermostatic switch being connected to the other side of said source of supply, and an auxiliary electric heating element in close heat exchange relation with said thermostatic switch and being connected across the two free terminals of said master heating elements, said auxiliary heating element having an electrical resistance of substantially smaller magnitude than said master heating elements.

ALVIN D. KEENE.